Oct. 14, 1952  F. E. DAVIS, III  2,614,226
PHOTOELECTRIC DEVICE
Filed Nov. 9, 1950

Inventor
Flavius E. Davis III
by Roberts, Cushman & Grove
Att'ys.

Patented Oct. 14, 1952

2,614,226

UNITED STATES PATENT OFFICE 2,614,226

PHOTOELECTRIC DEVICE

Flavius E. Davis, III, Jackson, Mich.

Application November 9, 1950, Serial No. 194,889

6 Claims. (Cl. 250—207)

This invention relates to an improved circuit for coupling the output of a multiplier type of photoelectric tube to an amplifier, and particularly to a circuit utilizing the output of a multipler phototube to operate a relay.

Such a circuit is useful in watt-hour meter testing apparatus for comparing a meter with a rotating standard. Previous meter testers have employed a source of light which was focused on the disk comprising the rotating movement of the meter under test. The anti-creep hole in the disk or a mirror fixed to the disk, or a black spot thereon then either increased or decreased the light falling on a phototube causing the phototube to conduct more or less. The response of the meter was then amplified and used to actuate control mechanism which started a rotating standard and stopped it after a predetermined number of revolutions of the meter. This prior apparatus necessitated very delicate and time-consuming mechanical adjustment of the light source and the phototube to insure that the phototube would respond to each revolution of the meter disk.

One object of the present invention is to provide a photoelectric pickup device responsive to general illumination and electronically adjustable to compensate for variations in that illumination. A further object is to provide an adjustable circuit for a multiplier phototube which is simple and economical to manufacture and use and which reduces to a minimum the electrical conductors between the photoelectric pickup device and the amplifier. A still further object is to provide means adapted to adjust the improved apparatus for operation on either an increase or decrease in light transmitted from the meter disk.

In one aspect the invention relates to an output circuit for coupling a multiplier phototube to an amplifier which comprises a potentiometer having a resistance element connected between one of the dynodes of the phototube and a point of more positive potential and an adjustable tap connected between the resistance element and the first output terminal, and a connection between the anode of the phototube and a second output terminal, the output terminals being connectable to the control grid and cathode of the amplifier tube whereby both a bias voltage and a signal voltage resulting from the response of the phototube to light changes may be applied to the amplifier. Preferably the potentiometer is connected at its negative end to the last of the series of dynodes in the phototube, and the connection between the aforesaid tap and one output terminal and between the anode and the other output terminal is direct.

In a further aspect the invention comprises switch means for reversibly connecting the aforesaid output terminals to the control grid and cathode respectively of the amplifier tube so that the amplifier is controlled by either an increase or decrease of light transmitted to the phototube.

For the purpose of illustration a typical embodiment of the invention is shown in the accompanying drawing in which Fig. 1 is a diagrammatic view of meter testing apparatus;

Figure 1:
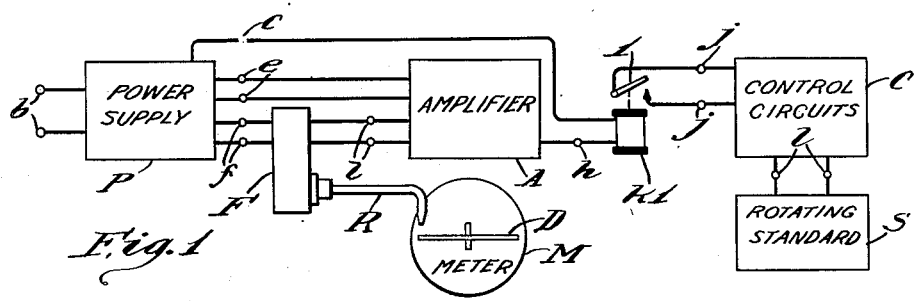

In the embodiment chosen for the purpose of illustration the meter testing apparatus shown diagrammatically in Fig. 1 comprises a power supply P, a photoelectric pickup device F having a light conducting rod R, an amplifier A, a control relay K1, control circuits C and a rotating standard S. The light conducting rod R is disposed so that its end is opposite the edge of the rotating disk D and directed towards the path of a black spot X adjacent the edge of the disk. As the black spot periodically passes the end of the rod R it decreases transmission to the rod of light provided by general illumination of the apparatus causing the photoelectric device F to generate an electric signal. This signal is amplified by the amplifier A and applied to the control relay K1. The switch 1 of the control relay closes certain of the control circuits C in such a way that the rotating standard S is energized for a preselected number of revolutions of the meter under test M and then deenergized. An error in the rate of revolution of the meter M is indicated if the standard has rotated a greater or lesser number of revolutions than was preselected.

Figure 2:
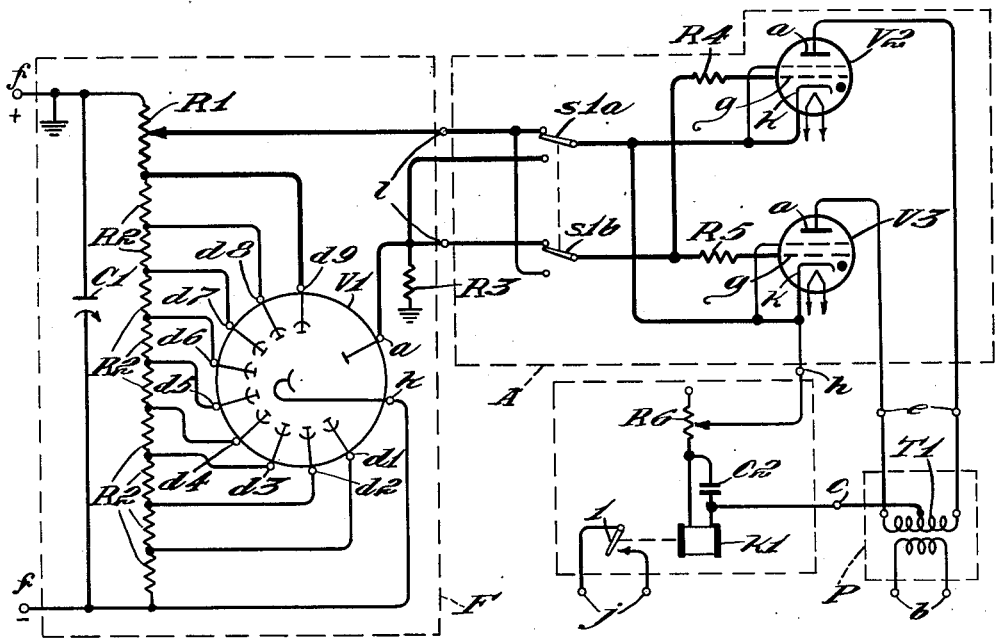
Fig. 2 is a schematic electrical drawing of part of the apparatus.

Fig. 2 illustrates the circuits of the photoelectric device F and the amplifier A. The multiplier phototube V1, such as the nine-stage electrostatically focused type 931-A manufactured by the Radio Corporation of America, includes a photocathode $k$, nine dynodes or secondary emission electrodes $d1$-$d9$ and an anode $a$. Approximately 1000 volts are supplied from the power supply P to the terminals $f$. D. C. voltages for the individual dynodes and the cathodes are furnished by a voltage divider network comprising the resistors R2 connected between the positive and negative terminals $f(+)$ and $f(-)$. The output terminals $l$ are connected respectively to the anode $a$ and the ninth dynode $d9$, the latter connection being made through the potentiometer R1 which is in series with the voltage divider resistances R2. The output terminals $l$ are connected through a double-pole, double-throw switch S1 having two contactors S1$a$ and S1$b$, to the control grids $g$ or the cathodes $k$ of a pair of amplifiers V2 and V3 arranged for push-pull operation. Gas filled thyratrons, for example type 2D21 tubes manufactured by the Radio Corporation of America are suitable amplifiers. Current from the anode of the phototube flows through a resistor R3 developing a voltage drop such that when the tube passes current the anode is negative with respect to the tapped point of R1 suitably adjusted. The potential between these two points is utilized to drive the grids of the thyratrons either negative or positive with respect to their cathodes through grid resistors R4 and R5. Anode voltages for the thyratrons V2 and V3 are supplied from the ends of the center-tapped secondary of the transformer T1 through terminals $e$. The cathodes of the thyratrons are connected through a terminal $h$ in series with the control relay K1 with which is associated a capacitance C2 to minimize chattering of the relay and a rheostat R6 for varying the voltage output of the amplifier A. The center tap of transformer T1 is connected to the relay K1 through a terminal $c$. Alternating current is supplied to the primary of the transformer T1 through terminals $b$.

Figure 3:
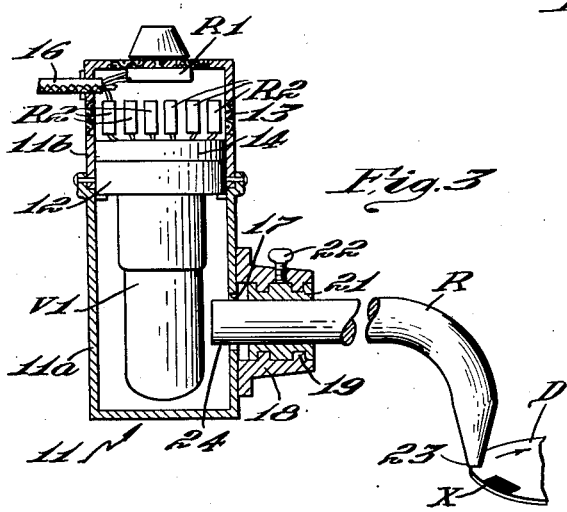
Fig. 3 is a sectional view of a photoelectric pickup device.

As shown in Fig. 3 the photoelectric tube V1 is mounted in a casing 11 having upper and lower portions 11$b$ and 11$a$. The lower portion 11$a$ is light tight except for an entrance 17 admitting the light conducting rod R. Fixed to the lower portion 11$a$ outside the opening 17 is a mounting 18 having deep threads 19 for receiving a chuck 21 which holds the light conducting rod R. A thumbscrew 22 threaded in the mounting 18 may be tightened to hold the chuck 21 and the rod R at any desired angle. The light conducting rod is formed from quartz or other light conducting substances such as the synthetic plastic marketed under the trade name Lucite. Such a rod has the property of transmitting light received at its outer end 23 to its inner end 24 which is directed at the photocathode of the phototube V1. The rod is cemented in the chuck 21 so as to prevent light from general illumination from passing interiorly of the chuck, and the interengagement of the deep threading 19 prevents light from passing between the chuck and the mounting 18. The envelope of the phototube V1 is disposed in the light tight portion 11$a$, while the pins of the phototube are inserted in a socket 12 extending into a ventilated portion 11$b$ having screened openings 13. Between the socket 12 and the screened openings 13 is a heat insulating disk 14. Mounted above the insulating disk 18 are the nine voltage divider resistances R2 and the potentiometer R1. A four-conductor cable 16 enters at the upper end of the ventilated portion 11$b$. The connections between the cable 16, the resistances and the socket for the phototube are as shown in Fig. 2.

According to the present invention the phototube output circuit not only provides the phototube signal potential for the amplifier but also affords a variable bias voltage for the control grids and cathodes of the amplifier. The signal voltage results from a change in electron current between the ninth dynode $d9$ and the anode $a$ in the well known manner. This voltage change appears across the output terminals $l$. The bias voltage, which is a steady direct current potential is derived from current passing from the voltage divider resistors R2 through the potentiometer R1 to ground. This potential is applied directly to the cathodes or control grids of the amplifier tubes V2 and V3 with the signal voltage of the phototube V1 superimposed thereon, and may be adjusted to compensate for the particular circuit conditions of the amplifier and for various intensities of general illumination by varying the position of the center tap of the potentiometer R1. The ganged switch S1 determines whether these signal output voltages are applied directly to the cathode $k$ or control grids $g$ of the amplifier tubes.

With switch S1 in the position shown, when the phototube responds to steady general illumination and if the potentiometer R1 is suitably adjusted, the grids of tubes V2 and V3 are driven negative with respect to their cathodes and no current is passed by the amplifier tubes through the relay K1. When the phototube is darkened, as when the black spot X passes beneath the end 23 of the rod R, the grids of the amplifiers are driven positive with respect to their cathodes and current is passed through the relay K1 causing it to transfer its contacts. After the black spot has passed the rod R and illumination is again increased the relay is de-energized on the next cycle of current through the transformer T1. Conversely when the switch S1 is in the position not shown, the amplifiers pass current only when the light transmitted through the rod is increased, as by transmission through the anti-creep hole of the disk D or by reflection from a mirror mounted thereon, in a manner well known to those skilled in the art.

Thus, with the above described simple output circuit it is now possible to adjust the output of the photoelectric device for extremely sensitive response to general illumination on both light and dark operations. Furthermore, with the circuit components arranged as shown in Fig. 3 it is possible to interconnect the device with the power supply and amplifier by a small four-conductor cable thus adding to the flexibility of the meter testing apparatus.

It should be understood that the present disclosure is for the purpose of illustration only and that this invention includes all modifications and equivalents which fall within the scope of the appended claims.

I claim:

1. For coupling to an amplifier tube a multipler phototube having a series of dynodes and an anode, an output circuit comprising output terminals for connection to the control grid and cathode of said amplifier tube, a potentiometer having a resistance element connected between one of said dynodes and a point of more positive potential and an adjustable tap connected between said element and one of said output terminals, and a connection between said anode and the other of said output terminals, whereby the output circuit may provide a bias control for the amplifier.

2. For a multipler phototube having a series of dynodes and an anode, an output circuit comprising an amplifier tube, output terminals connected to the control grid and cathode of said amplifier tube, a potentiometer having a resistance element connected between one of said dynodes and a point of more positive potential and an adjustable tap connected between said element and one of said output terminals, and a connection between said anode and the other of said output terminals, whereby the output circuit may provide a bias control for the amplifier.

3. For coupling to an amplifier tube a multiplier phototube having a series of dynodes and an anode, an output circuit comprising output terminals for connection to the control grid and cathode of said amplifier tube, a potentiometer having a resistance element connected between one of said dynodes and a point of more positive potential and an adjustable tap connected between said element and one of said output terminals, a connection between said anode and the other of said output terminals, and switch means for reversibly connecting said terminals to the control grid and the cathode respectively of said amplifier tube, whereby the output circuit may provide a bias control for the amplifier, and said amplifier may be controlled by either an increase or decrease of light transmitted to the phototube.

4. A photoelectric device comprising an amplifier tube, a multiplier phototube having a series of dynodes and an anode, a source of negative voltage, intermediate said source and ground a potentiometer having a resistance element connected at its negative end to the last of said series of dynodes an having an adjustable tap, a direct connection between said tap and one output terminal and between said anode and the other of said output terminals, thereby providing a bias control for the amplifier.

5. A photoelectric circuit comprising a multiplier phototube having a photocathode, an anode and a series of dynodes, a series of voltage divider resistances, a pair of power input terminals for supplying direct current to said resistances, connections between said resistances and the photocathode and dynodes for supplying operating power thereto, in series with said resistances a potentiometer, an adjustable tap for the potentiometer, a pair of output terminals, and a connection between said tap and one output terminal and between said anode and the other output terminal.

6. A photoelectric pickup unit comprising a housing, within the housing a multiplier phototube having a photocathode, an anode and a series of dynodes, a longitudinally translucent rod for conducting light from without the housing to said photocathode, mounted at the housing a series of voltage divider resistances, a pair of power input terminals for supplying voltages to said resistances, connections between said resistances and the photocathode and dynodes, in series with said resistances a potentiometer, an adjustable tap for the potentiometer, a pair of output terminals, and a connection between said tap and one output terminal and between said anode and the other output terminal.

FLAVIUS E. DAVIS, III.

REFERENCES CITED

The following references are of record in the file of this patent:

UNITED STATES PATENTS

| Number | Name | Date |
| --- | --- | --- |
| 1,857,593 | Hill | May 10, 1932 |
| 2,454,169 | Haynes | Nov. 16, 1948 |
| 2,476,217 | Pond | July 12, 1949 |
| 2,534,668 | Gunderson | Dec. 19, 1950 |